Dec. 2, 1947. A. L. PARKER 2,431,769
QUICK OPENING CHECK VALVE ASSEMBLY
Filed April 30, 1943
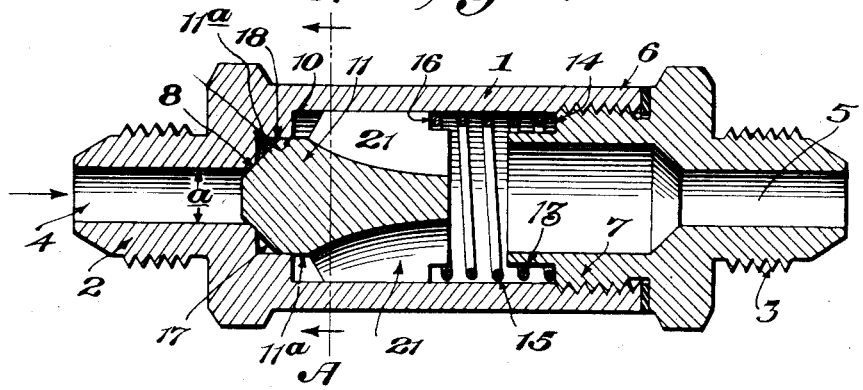
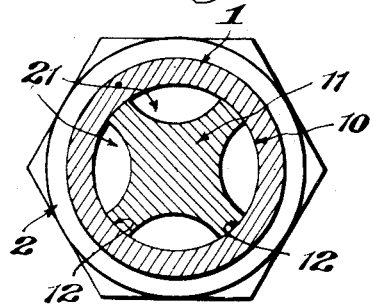
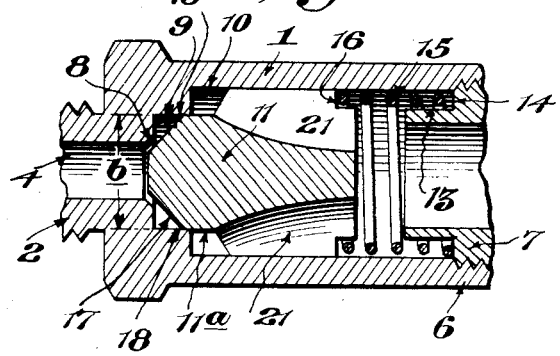
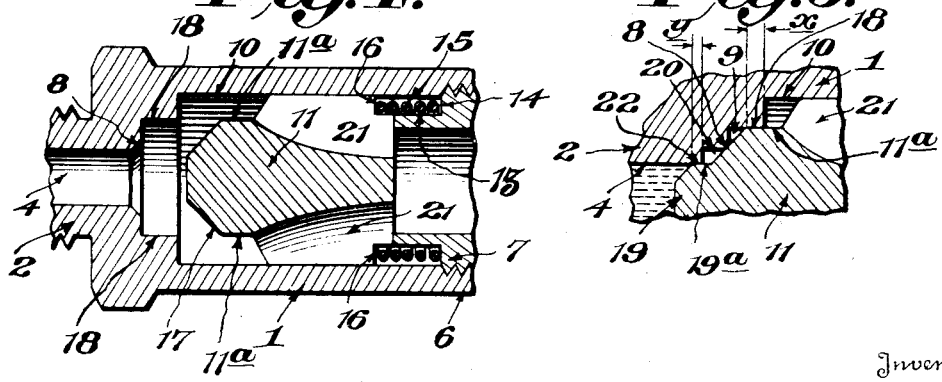
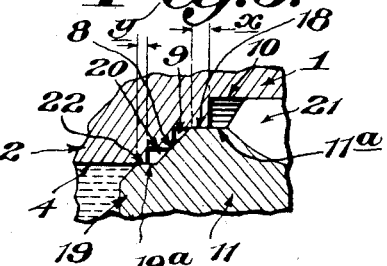
Inventor
Arthur L. Parker
By Mason, Porter & Diller
Attorneys Patented Dec. 2, 1947

2,431,769

UNITED STATES PATENT OFFICE 2,431,769

QUICK OPENING CHECK VALVE ASSEMBLY

Arthur L. Parker, Cleveland, Ohio, assignor to The Parker Appliance Company, Cleveland, Ohio, a corporation of Ohio Application April 30, 1943, Serial No. 485,232

1 Claim. (Cl. 251—146)

The invention relates to new and useful improvements in a check valve assembly which is particularly adapted for use in aircraft hydraulic pressure lines where it is desired to limit the flow of fluid in only one direction.

An object of the invention is to provide a check valve which will open very quickly and permit flow therethrough with a minimum pressure drop.

A further object of the invention is to provide a construction of check valve and casing therefor wherein the valve is cushioned in its closing movement so as to prevent too rapid closing and pounding of the valve on the seat.

In the drawings,

Figure 1 is a longitudinal section through a check valve assembly embodying the improvements.

Figure 2 is a sectional view on the line A—A of Figure 1.

Figure 3 is a view similar to Figure 1 but showing the valve as slightly moved from its seat so that a greater area of the valve is exposed to the fluid pressure on the line.

Figure 4 is a view showing the valve in full opening position.

Figure 5 is a slightly enlarged sectional view through the valve showing a modified form of means for cushioning the closing movement of the valve.

The improved check valve assembly includes a casing 1 having a projection 2 at one end thereof and a projection 3 at the other end thereof. The projection 2 is adapted to be connected to a pipe section in a fluid pressure line, and the projection 3 to a hydraulic unit operated by the fluid pressure. The projecting portion 2 is provided with a port 4 and the projecting portion 3 is provided with a port 5. The casing is made in two sections. The outer section 6 has a threaded connection with an inner section 7.

Surrounding the port 4, at the inner end thereof is a valve seat 8. At the inner side of this valve seat is a recess 9 surrounded by a cylindrical wall 18 which is of greater diameter than the port 4 and lesser diameter than the inner wall 10 of the casing section 6. Mounted for reciprocation in the casing section 6 is a valve 11. The valve, as shown in Fig. 2, has four ribs or projecting portions 12 which engage the inner wall of the casing section 6 so that the valve is centered in the casing and guided by these ribs moving longitudinally of the casing.

The casing section 7 is provided with an annular cutaway portion leaving a recess 13 which provides an abutment 14 for a spring 15 which bears at its other end against the valve. The valve is also cut away so as to provide a recess 16 for the spring. This spring normally forces the valve to the left as viewed in Figure 1 and holds the valve in engagement with the valve seat.

The end of the valve contacting with the valve seat 8 is tapered as indicated at 17. Immediately adjacent the tapered section at the end of the valve is a solid cylindrical portion 11a. The tapered section is of such length and the cylindrical section 11a is dimensioned so that it moves into the recess 9. The cylindrical surface 11a of the valve is so dimensioned relative to the cylindrical surface 18 of the casing so as to provide a free sliding fit between the valve and the casing.

Under normal conditions on the line, the valve is seated through the action of the spring 15 thereon, as shown in Figure 1 of the drawings.

The area of the valve subjected to the line pressure when the valve is seated is indicated by the arrows $a$. When the pressure differential between opposite sides of the valve exceeds the spring pressure, then the valve will move to the position shown in Figure 3. As soon as the valve is moved away from its seat even to a slight extent, the fluid under pressure will then contact with the entire tapered end of the valve and the area subjected to the line pressure will be increased, as indicated by the arrows $b$. This increased area against which the fluid pressure operates will move the valve very rapidly toward its full open position, as shown in Figure 4.

As soon as the cylindrical portion 11a moves out of the recess, then the fluid will flow past the valve head and through the spaces 21 between the ribs and through the port 5 to the hydraulic unit with which it is associated. The valve will contact with the end of the inner casing section which serves as a stop to limit the movement of the valve, and when in this position, there is a free flow of fluid through the valve casing.

The increased area on the valve head is subjected to the pressure of the fluid flowing through the valve casing when the valve is in open position, and therefore the valve will be maintained open until the pressure differential on opposite sides of the valve drops well below the pressure differential at which the valve was opened. When the pressure differential drops below the spring pressure, then the valve will be returned to closed position to prevent return flow of fluid. As the valve head moves into the recess, fluid will be trapped in the recess and will escape through the opening between the valve head and the seat 8. This opening will gradually diminish until finally the valve is seated. This provides a cushioning means for preventing the valve from chattering during seating.

In Figure 5 of the drawings, there is a slightly modified shaping of the casing of the valve in the region of the valve seat for further cushioning the movement of the valve to closed position. The valve casing in this form is provided with a valve seat 8 and a cushioning recess 9 similar to that described above in connection with Figures 1 to 4. The valve seat 8, however, instead of being located at the inner end of the port 4 is spaced inwardly therefrom, and between the valve seat and the port 4 there is a second cylindrical recess 20. The valve 11 is provided with an extension 19 which is surrounded by a cylindrical surface 19a, having a free sliding fit in the port 4. The portion of the cylindrical wall 18 indicated at $x$ in Fig. 5 is slightly greater than the portion of the cylindrical wall 19a indicated at $y$. When the pressure on the line reaches a predetermined point so as to overcome the resistance of the spring, the valve 11 will move away from its seat. As soon as the cylindrical surface 19a moves out of the port 4, fluid will pass into the recesses 20 and 9. This occurs before the valve moves away from the inner end of the cylindrical surface 18, and therefore the area of the valve subjected to fluid pressure is increased just as described above in connection with Figs. 1 to 4, and the valve will move quickly to open position. When the pressure differential drops so that the spring closes the valve, both the chambers 9 and 20 will serve as a cushioning means for retarding the movement of the valve and gently ease it onto its seat. This reduces the liability of the valve chattering during seating to a minimum. Owing to the overlap indicated at $x$ being greater than the overlap indicated at $y$, the surface 11a will move into the recess 9 before the cylindrical surface 19a moves into the port 4. This will trap fluid in both the recesses 9 and 22 and the fluid will gradually flow from the recess 22 into the port and from the recess 9 through the recess 22 into the port to permit the gradual closing of the valve against the seat.

From the above it will be apparent that a check valve has been provided which is of few parts and of simple construction, and which may be made relatively small. When the pressure differential on opposite sides of the valve overcomes the set spring pressure on the valve, the valve will move away from its seat to increase the effective area of the valve opening and therefore the valve will be quickly moved to its open position so as to permit a free flow of fluid from the line through the valve casing with a minimum pressure drop and out through the port 5. As soon as the valve opens, the pressure drop through the valve reduces to a value considerably less than the initial pressure differential required to cause opening of the valve. It is very important in aircraft hydraulic systems to maintain the pressure drop through the piping, fittings, and valves at a minimum so as to be able to utilize as much as possible of the available power for actuating the hydraulic equipment. The valve will be maintained in this open position by the increased area subjected to the fluid pressure, and therefore the valve will not close until the pressure differential is dropped well below that which was necessary for opening the valve. When the flow in the line tends to be reversed, the back pressure and spring pressure closes the valve and the final closing movement of the valve will be checked and cushioned by the trapping of fluid in the recess 9 or by trapping of the fluid in both the recesses 9 and 22 in the modified form of construction shown in Fig. 5.

It is obvious that minor changes in details of construction and the arrangement of the parts may be made without departing from the spirit of the invention as set forth in the appended claim.

I claim:

A quick opening check valve assembly comprising a casing having at its opposite ends projecting portions for pipe connections, each projecting portion having a port leading therefrom to the interior of the casing, said casing including sections removably connected one to the other, a valve seat associated with one of said ports, said casing at the outer side of said valve seat having a cylindrical recess of larger diameter than the port and at the inner side of said valve seat a cylindrical recess of larger diameter than the port and lesser diameter than the interior of the casing, a valve slidably mounted in the casing, a spring for normally holding said valve seated, said valve having a depressed end adapted to engage said seat, a projecting cylindrical portion adapted to move into and out of the port with a free sliding fit and a second cylindrical portion adapted to move into and out of the recess at the inner side of said seat, the overlap between the first named cylindrical portion and the wall of the port when the valve is closed being less than the overlap between the second cylindrical section of the valve and the wall of the inner recess whereby the area of the valve exposed to the fluid pressure on the line is greatly increased when the valve moves away from its seat for quickly opening the valve and whereby two cushioning chambers are provided for retarding the final closing of the valve.

ARTHUR L. PARKER.

REFERENCES CITED

The following references are of record in the file of this patent:

UNITED STATES PATENTS

| Number | Name | Date |
|---|---|---|
| 2,318,963 | Parker | May 11, 1943 |
| 2,223,944 | Roy | Dec. 3, 1940 |
| 2,165,611 | Campbell | July 11, 1939 |
| 1,694,427 | Nielsen | Dec. 11, 1928 |
| 152,179 | Shaw | June 16, 1874 |
| 1,777,680 | Schabarum | Oct. 7, 1930 |
| 1,539,617 | Williston | May 26, 1925 |
| 2,223,509 | Brauer | Dec. 3, 1940 |
| 2,185,173 | Fortune | Jan. 2, 1940 |
| 1,128,092 | Barrett | Feb. 9, 1915 |
| 1,036,387 | Wainwright | Aug. 20, 1912 |

FOREIGN PATENTS

| Number | Country | Date |
|---|---|---|
| 12,078 | Great Britain | 1848 |